US011279294B2

(12) United States Patent
Menegazzo et al.

(10) Patent No.: US 11,279,294 B2
(45) Date of Patent: Mar. 22, 2022

(54) ASSEMBLIES FOR SUPPORTING A LOAD RELATIVE TO A ROOF OF A VEHICLE

(71) Applicant: ARB Corporation Ltd, Kilsyth (AU)

(72) Inventors: Andrew Guy Menegazzo, Kilsyth (AU); James Kenneth Robert Luke, Kilsyth (AU); Gavin James Smith, Kilsyth (AU)

(73) Assignee: ARB CORPORATION LTD, Kilsyth (AU)

( * ) Notice: Subject to any disclaimer, the term of this patent is extended or adjusted under 35 U.S.C. 154(b) by 0 days.

(21) Appl. No.: 16/738,144

(22) Filed: Jan. 9, 2020

(65) Prior Publication Data
US 2020/0223371 A1  Jul. 16, 2020

(30) Foreign Application Priority Data

Jan. 10, 2019 (AU) ................................ 2019900072
Jun. 6, 2019 (AU) ................................ 2019901954

(51) Int. Cl.
*B60R 9/04* (2006.01)
(52) U.S. Cl.
CPC ....................................... *B60R 9/04* (2013.01)
(58) Field of Classification Search
CPC ........... B60R 9/04; B60R 9/045; B60R 9/058; B60R 9/052
See application file for complete search history.

(56) References Cited

U.S. PATENT DOCUMENTS

| 3,545,660 | A | * | 12/1970 | James | B60R 9/045 224/321 |
| 4,099,658 | A | | 7/1978 | Bott | |
| 4,269,340 | A | | 5/1981 | Kowalski et al. | |
| 4,274,570 | A | | 6/1981 | Bott | |
| 4,616,771 | A | * | 10/1986 | Heideman | B60R 9/045 224/321 |
| 5,577,650 | A | * | 11/1996 | Stapleton | B60R 9/045 224/321 |
| 5,732,864 | A | * | 3/1998 | Stapleton | B60R 9/045 224/309 |

(Continued)

FOREIGN PATENT DOCUMENTS

| AU | 331951 | 6/2010 |
| AU | 331952 | 6/2010 |

(Continued)

OTHER PUBLICATIONS

Roof rack page of the Hannibal website, published at least as early as Feb. 11, 2010 (accessed through the Wayback Machine downloaded from https://web.archive.org/web/20100211035829/http://www.hannibal.co.za/default.asp?pageid=540.

*Primary Examiner* — Corey N Skurdal
(74) *Attorney, Agent, or Firm* — Browdy and Neimark, PLLC

(57) ABSTRACT

Assemblies for supporting a load relative to a roof of a vehicle, and vehicle roof tray assemblies are disclosed. Disclosed assemblies include an elongate member and an engaging mechanism. The elongate member defines a support surface for supporting the load, and has a pair of opposed, diverging retention surfaces extending away from the support surface. The engaging mechanism is configured to abut the retention surfaces to engage the elongate member. A slat for a vehicle roof tray is also disclosed.

27 Claims, 13 Drawing Sheets

(56) References Cited

U.S. PATENT DOCUMENTS 8,132,701 B2* 3/2012 Verhelst .................... B60R 9/10
                                                    224/558
2018/0072506 A1* 3/2018 Stuart .................. B65G 25/065

FOREIGN PATENT DOCUMENTS

| AU | 331953 | 6/2010 |
|----|--------|--------|
| AU | 2011286169 | 2/2012 |

* cited by examiner

ASSEMBLIES FOR SUPPORTING A LOAD RELATIVE TO A ROOF OF A VEHICLE

TECHNICAL FIELD

The present disclosure relates generally to assemblies for supporting a load relative to a roof of a vehicle. In particular, the disclosure relates to vehicle roof tray assemblies which are generally configured to be affixed relative to the roof of the vehicle and define a platform to support the load.

BACKGROUND

To increase cargo carrying capacity of a vehicle it is common to secure roof racks/bars to a roof of a vehicle. Such racks allow a load to be supported above the roof. To further enhance this arrangement, a roof tray may also be secured to the roof (or the roof racks). Roof trays provide a platform on which the load is supported and often include a guard rail extending around the platform to assist retaining the load on the platform.

The platform of a roof tray usually comprises a plurality of joined slats or bars to which objects, such as cargo or roof tray accessories, are removably secured. The objects are typically secured to the platform by various brackets and/or clamps, which may be configured to secure specific cargo to the roof tray, such as a bespoke shovel bracket or jack mount. Providing a robust connection between the objects and the roof tray can prove important as failure of this connection can result in the objects being lost during transit. This issue can be exacerbated if the vehicle is driven across uneven surfaces, such as when driving the vehicle 'off-road', as travelling across such surfaces typically transfers substantial vibrations/shocks to the roof tray which increase the likelihood of the connection failing.

Any discussion of documents, acts, materials, devices, articles or the like which has been included in the present specification is not to be taken as an admission that any or all of these matters were common general knowledge in the field relevant to the present disclosure as it existed before the priority date of each of the appended claims.

SUMMARY

According to some disclosed embodiments, there is provided an assembly for supporting a load relative to a roof of a vehicle, the assembly including an elongate member and an engaging mechanism. The elongate member defines a support surface for supporting the load, and has a pair of opposed, diverging retention surfaces extending away from the support surface. The engaging mechanism is configured to abut the retention surfaces to engage the elongate member.

The support surface may be configured to extend in a first direction and the retention surfaces extend outwardly from a side of the support surface to diverge relative to the first direction.

The retention surfaces may be defined by at least one flange extending from the support surface.

Each retention surface may define a free end, and the elongate member include an end face joining the free ends.

The elongate member may define a sidewall extending transverse to the support surface, and the retention surfaces be defined by at least one flange extending from the sidewall. The retention surfaces may also be spaced from the sidewall by a junction portion extending from the sidewall.

The support surface may be planar, and the, or each, flange defines a free end arranged operatively below the plane of the support surface.

The retention surfaces may be defined on opposed sides of a flared flange.

The elongate member may be an extrusion, and the support surface and the retention surfaces are integrally formed surfaces of the extrusion.

The engaging mechanism may comprise two portions, each portion defining an abutment surface arranged to abut one of the retention surfaces, and at least one of the portions is movable relative to the other portion, so that, in use, the abutment surfaces urge against the retention surfaces.

The engaging mechanism may include an actuator operable to move at least one of the portions relative to each other.

Where the support surface is planar, and the actuator may be arranged to exert a linear force transversely to the plane of the support surface. Alternatively or additionally, each retention surface may be planar, and the actuator is arranged to exert the linear force parallel to the plane of one of the retention surfaces.

A first portion of the engaging mechanism may be shaped to at least one of abut the support surface and extend across a free end of one of the retention surfaces, and a second portion of the engaging mechanism may define a re-entrant portion defining the abutment surface, and the actuator may be operable to move the abutment surface of the re-entrant portion along one of the retention surfaces.

The first portion of the engaging mechanism may define a free end configured to support an object relative to the support surface, and the second portion be configured as a cover shaped to at least partially cover the first portion.

The actuator may be operable to rotate one of the abutment surfaces, so that, in use, rotating the actuator causes rotation of the one of the abutment surfaces to engage one of the retention surfaces. The one of the abutment surfaces may be defined on a cam portion.

At least one of the abutment surfaces may be defined by a resiliently deformable material. In this embodiment, one of the portions of the engaging mechanism may be resiliently deformable.

One of the portions of the engaging mechanism may define a partially enclosed channel. The channel may be arranged to extend parallel to the support surface.

One of the portions of the engaging mechanism may include a bracket defining one or more apertures configured to receive a fastener. The bracket may be arranged to extend substantially perpendicular to the support surface.

The elongate member may be configured as a slat, so that, in use, the slat associated with like slats to form a platform to support the load.

According to other disclosed embodiments, there is provided a vehicle roof tray assembly for supporting a load relative to a roof of a vehicle, the assembly comprising a plurality of slats connected together to form a platform, each slat defining a support surface for supporting the load, and each slat having a pair of opposed, diverging retention surfaces extending away from the support surface, and an engaging mechanism configured to abut the retention surfaces of one of the slats to engage the slat.

The platform may define a peripheral region, and the plurality of slats be arranged so that at least some of the retention surfaces extend from the peripheral region.

Each slat may define a longitudinal length, and the retention surfaces extend along the longitudinal length.

According to other disclosed embodiments, there is provided a slat for a vehicle roof tray, the slat comprising a support surface for supporting a load, and a pair of opposed, diverging retention surfaces extending away from a the support surface.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated embodiments may comprise steps, features and/or integers disclosed herein or indicated in the specification of this application individually or collectively, and any and all combinations of two or more of said steps or features.

BRIEF DESCRIPTION OF DRAWINGS

Embodiments will now be described by way of example only with reference to the accompany drawings in which.

DESCRIPTION OF EMBODIMENTS

Figure 11:
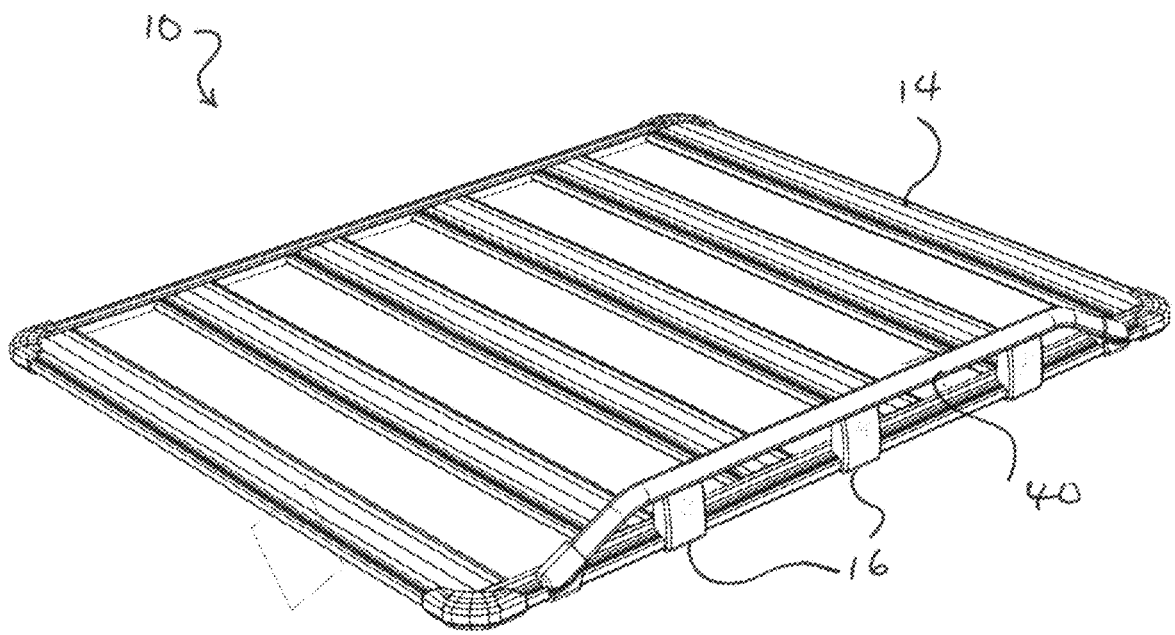
FIG. 11 is a perspective view of an alternative configuration of the assembly shown in FIG. 1 including a guard rail arranged along one side of the platform.

In the drawings, reference numeral 10 generally designates a vehicle roof tray assembly 10 for supporting a load (not illustrated) relative to a roof of a vehicle (not illustrated). The assembly 10 includes a plurality of elongate members, in the form of slats 12, connected together to form a platform 14 (FIG. 1), and an engaging mechanism 16 (FIG. 11). Each slat 12 defines a support surface 18 for supporting the load, and each slat 12 has a pair of opposed, diverging retention surfaces 20 extending outwardly from the support surface 18. The engaging mechanism 16 is configured so that, in use, the engaging mechanism 16 abuts the retention surfaces 20 of one of the slats 12 to engage the slat 12.

Figure 1:
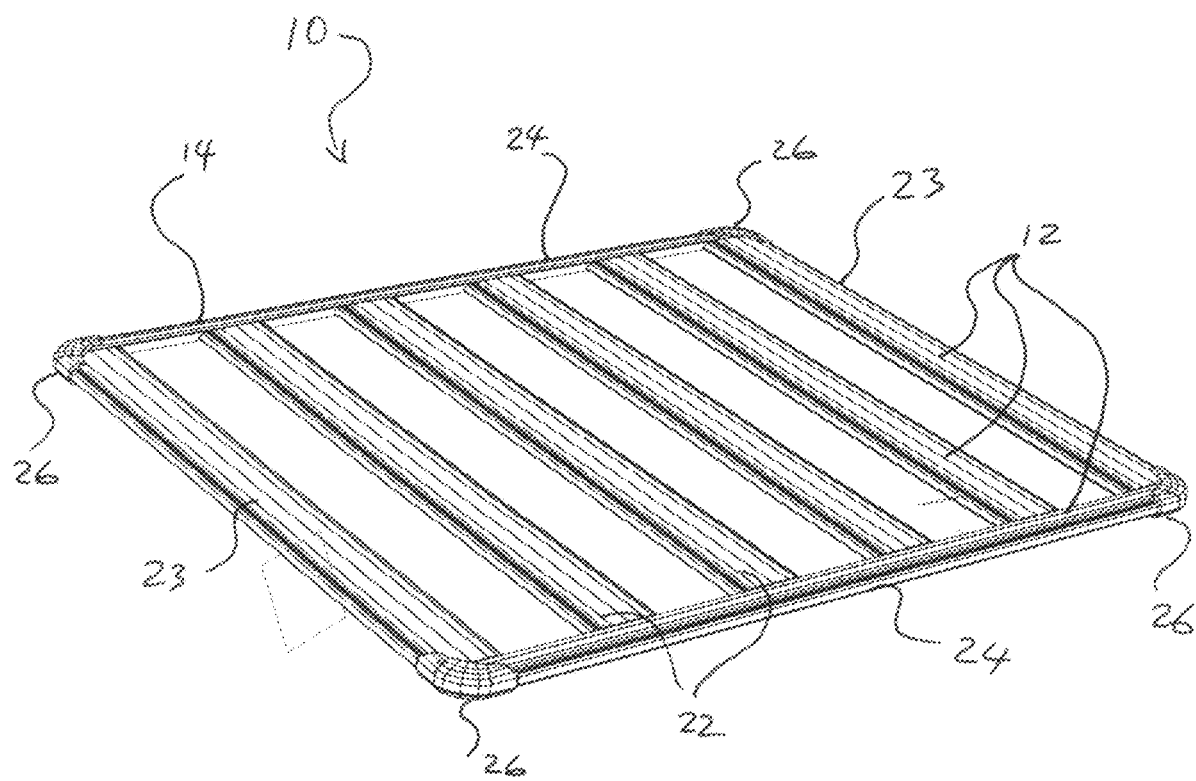
FIG. 1 is a perspective view of a vehicle roof tray assembly configured as a platform.

FIG. 1 shows the vehicle roof tray assembly 10. The roof tray 10 comprises cross-slats 22, 23 which are joined to side-slats 24 to form the platform 14. The platform 14 is configured to be affixed to a roof of a vehicle (not illustrated), or to roof racks/roof bars (not illustrated) which are secured to the vehicle, to support the load relative to the roof. The platform 14 is typically secured to the roof of the vehicle by a bracket (not illustrated) which is configured to conform and be fitted to a roof profile of one or more specific vehicle models.

The platform 14 is formed by a linear array of first cross-slats 22 and a pair of second cross-slats 23, arranged at opposed sides of the array, being joined to a pair of opposed side-slats 24. A corner assembly 26 is secured at each corner of the platform 14. The corner assembly 26 includes a pair of housings (not illustrated) which are arranged on opposed sides of the platform 14 and joined to each other, typically by a plurality of fasteners (not illustrated).

Figure 2:
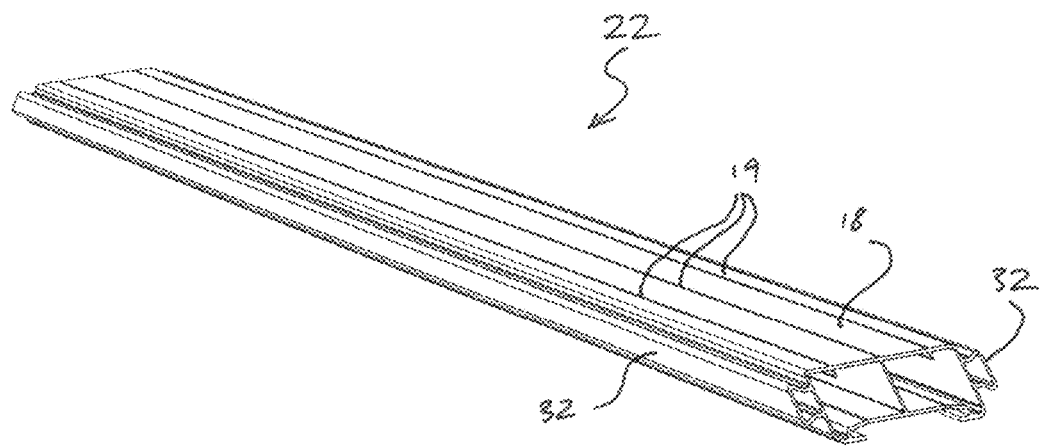
FIGS. 2 to 4 are perspective, side and end views, respectively, of a slat which forms part of the platform shown in FIG. 1.
Figure 3:
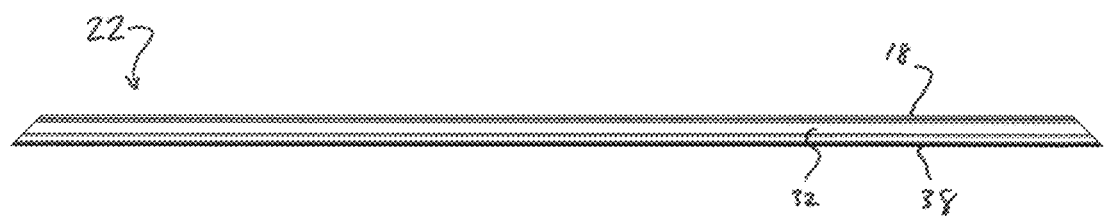
Figure 4:
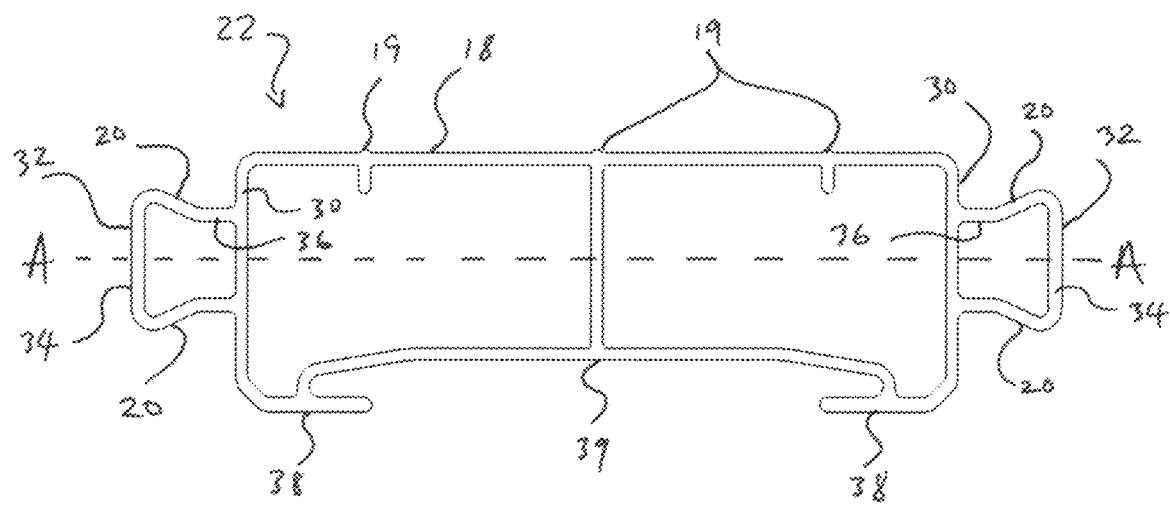
Figure 5:
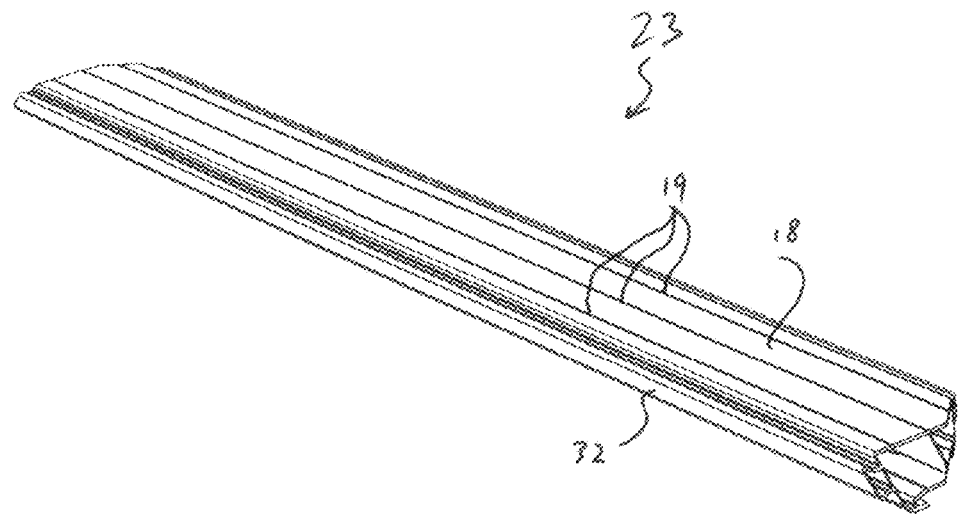
FIGS. 5 to 7 are perspective, top and end views, respectively, of an alternative configuration of the slat shown in FIGS. 2 to 4.
Figure 6:
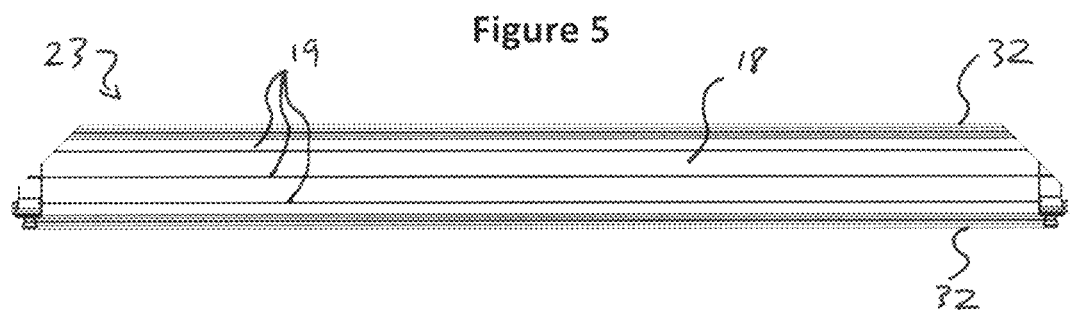
Figure 7:
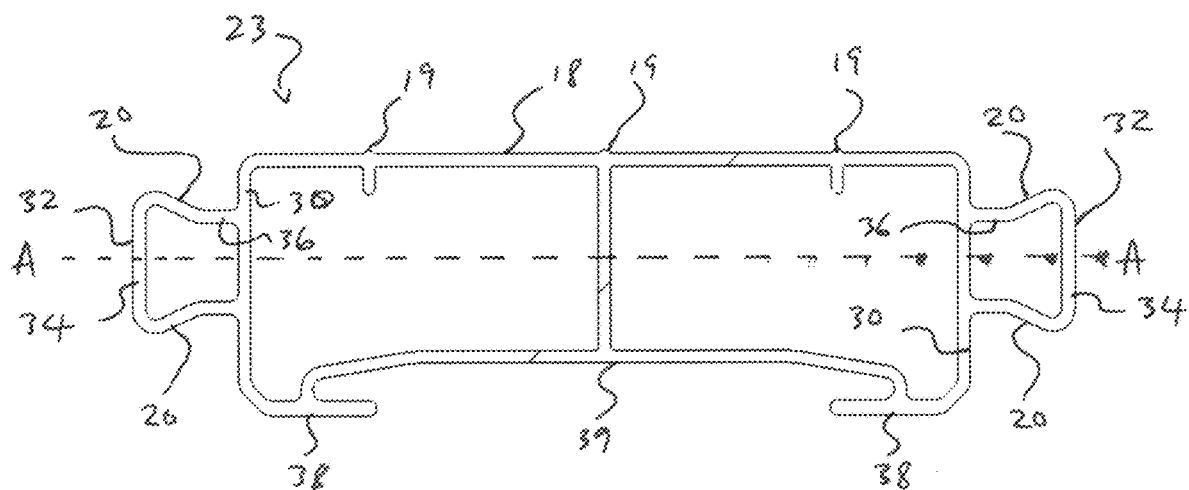
Figure 10:
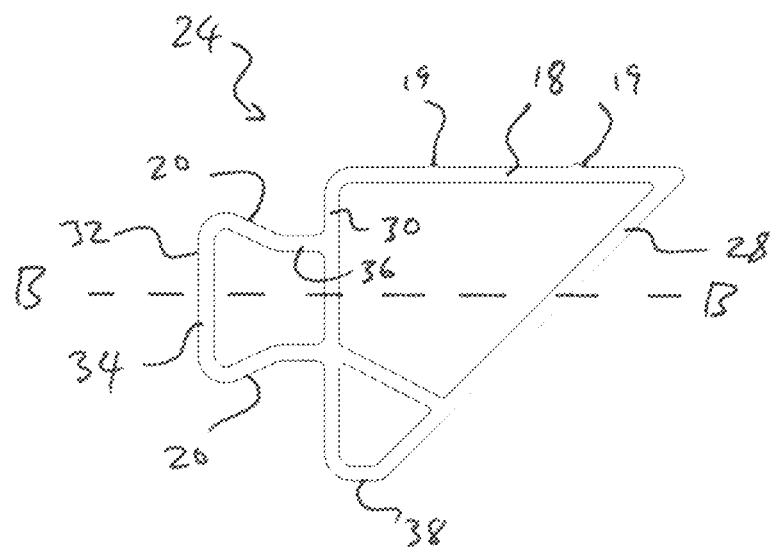

As shown in FIG. 10, each side-slat 24 defines a sloped junction surface 28 extending from one side of the support surface 18 diagonally towards the other side of the support surface 18. As shown in FIGS. 2 and 3, each end of each first cross-slat 22 is obliquely shaped to abut the junction surface 28. As shown in FIG. 5, each end of the second cross-slat 23 is also obliquely shaped to abut the junction surface 28. To assemble the platform 14, the cross-slats 22, 23 are arranged to abut the junction surfaces 28 of the side-slats 24 and welded to permanently affix the slats 22, 23, 24 together. It will be appreciated that other joining techniques may be employed, such as bonding with adhesive(s) and/or connecting with mechanical fasteners.

FIGS. 2 to 7 show the first and second cross-slats 22, 23. The second cross-slat 23 is an alternative configuration of the first cross-slat 22, where the ends of the second cross-slat 23 are shaped differently to the ends of the first cross-slat 22. The alternative configuration of the ends of the second cross-slat 23 enhances fitting within the corner assembly 26.

Each cross-slat 22, 23 defines the support surface 18, in the embodiment shown, being a substantially planar top surface 18 defining three ridges 19 to enhance friction between the support surface 18 and the supported load. Viewed in cross-section (FIGS. 4, 7), the support surface 18 extends in a direction A-A. A pair of retention surfaces 20 are arranged extending outwardly from each side of the support surface 18 to diverge relative to the direction A-A. It will be appreciated that the retention surfaces 20 may be alternatively arranged to extend away from the support surface 18, tier example, to extend perpendicularly away from the support surface 18 (not illustrated).

Each cross-slat 22, 23 defines a base surface 38 either side of a base channel 39. The channel 39 is configured to receive a bracket (not illustrated) or fastener (not illustrated) to secure the slat 22, 23 to the vehicle (or a roof rack). The arrangement of the channel 39 in combination with the oblique shaped ends of the slats 22, 23 mean that the bracket/fastener can be arranged at any position along the slat 22, 23, including at or close to the end of the slat 22, 23, thereby optimising a range of positions available for fastening to suit a range of roof geometries defined by various models of vehicles.

In the illustrated embodiment, the cross-slat 22, 23 includes a side-wall 30 extending at each side of the support surface 18 and substantially perpendicular to the support surface 18. It will however be appreciated that the side-wall 30 may be alternatively configured to extend otherwise transverse to the support surface 18, for example, to define an oblique side-wall (not illustrated).

A flared flange 32 extends from at least one of the side-walls 30, in the embodiment shown, extending from each side-wall 30. The flange 32 defines the retention surfaces 20 on opposed sides, the retention surfaces 20 being configured as substantially planar surfaces arranged at an angle to the direction A-A, and includes an end face 34 joining a free end of each retention surface 20. A junction section 36 spaces the retention surfaces 20 from the side-wall 30. The flange 32 defines a free end, at the end wall 34, which is spaced operatively below the plane of the support surface 18. This positions the entirety of the flange 32 at a level below the level of the support surface 18. It will however be appreciated that the flange 32 may be alternatively arranged, tor example, to extend directly from the support surface 18 (not illustrated).

it will be appreciated that the cross-slats 22, 23 may be alternatively configured so that the retention surfaces 20 are arranged in an alternative position relative to each other and/or the support surface 18. For example, each cross-slat 22, 23 may have one of the retention surfaces 20 arranged immediately adjacent the support surface 18 to form an angled lip (not illustrated) running along an edge of the support surface 20. In this embodiment, the other retention surface 20 may be arranged immediately adjacent a base surface 38 to form another lip running along an edge of the base surface 38. Alternatively, or additionally, the retention surfaces 20 may not be joined by an end face 34 and, instead, define an at least partially open side of the cross-slat 22, 23. Further alternatively, the retention surfaces 20 may be defined on a pair of spaced, separate flanges or fins (not illustrated) extending at an angle from one of the side-walls 30. It will also be appreciated that the junction section 36 may be absent so that the retention surfaces 20 extend directly from the side-wall 30.

Figure 8:
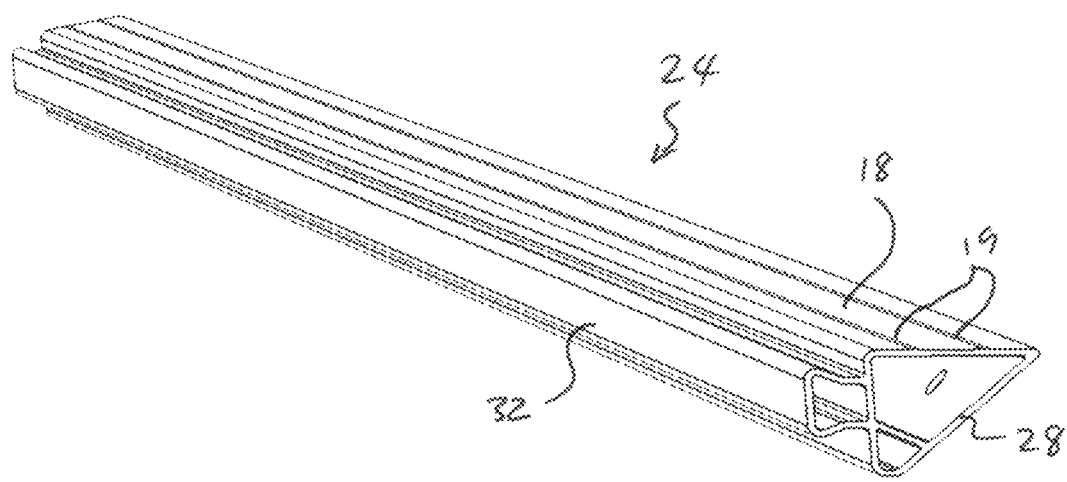
FIGS. 8 to 10 are perspective, top and end views, respectively, of an alternative slat which forms part of the platform shown in FIG. 1.
Figure 9:

FIGS. 8 to 10 show the side-slat 24. The side-slat 24 shares features with the cross-slats 22, 23, whereby common reference numerals indicate common features.

The side-slat 24 defines the support surface 18 and two ridges 19. Viewed in cross-section (FIG. 10), the support surface 18 extends in the direction B-B. A pair of retention surfaces 20 are arranged at one side of the support surface 18 to diverge away from the direction B-B. In the illustrated embodiment, the side-slat 24 includes a side-wall 30 extending at one side of the support surface 18 and the junction wall 28 extending from the other side of the support surface 18. The flared flange 32 extends from the side-wall 30 to define the retention surfaces 20, end face 34 and junction section 36.

In the illustrated embodiments, each of the cross-slats 22, 23 and side-slat 24 are formed as extrusions to define a consistent cross-section along a longitudinal length so that the flange 34 runs along the length of each slat 22, 23, 24. This means that when the slats 22, 23, 24 are connected together to form the platform 14, some of the flanges 34 extend from a periphery of the platform 14 to form a substantially continuous rail around the platform 14. This allows any of the engaging mechanisms 16 (discussed below) to be installed or removed at virtually any position around the periphery of the platform 14. Similarly, any of the engaging mechanisms 16 may be secured to any position along a side of any of the cross-slats 22, 23.

Each of the support surface 18 and the retention surfaces 20 are integrally formed surfaces of the extrusion. Configuring the slats 22, 23 24 as extrusions can prove cost-effective to manufacture as considerable lengths of each extrusion can be fabricated and then cut to a desired length and end profile. It will be appreciated that any of the slats 22, 23, 24 may be alternatively configured to comprise more than one part (not illustrated), including more than one extrusion, so that, for example, one part defining one or both retention surfaces 2( )is joined to another part defining the support surface 18.

FIGS. 11 shows an alternative configuration of the roof tray assembly 10 having a guard rail assembly 40 secured to the platform 14. The guard rail assembly 40 includes a plurality of engaging mechanisms 16 configured to releasably secure a guard rail 42 to the platform 14 and support the guard rail 42 relative to the support surface 18.

Figure 12:
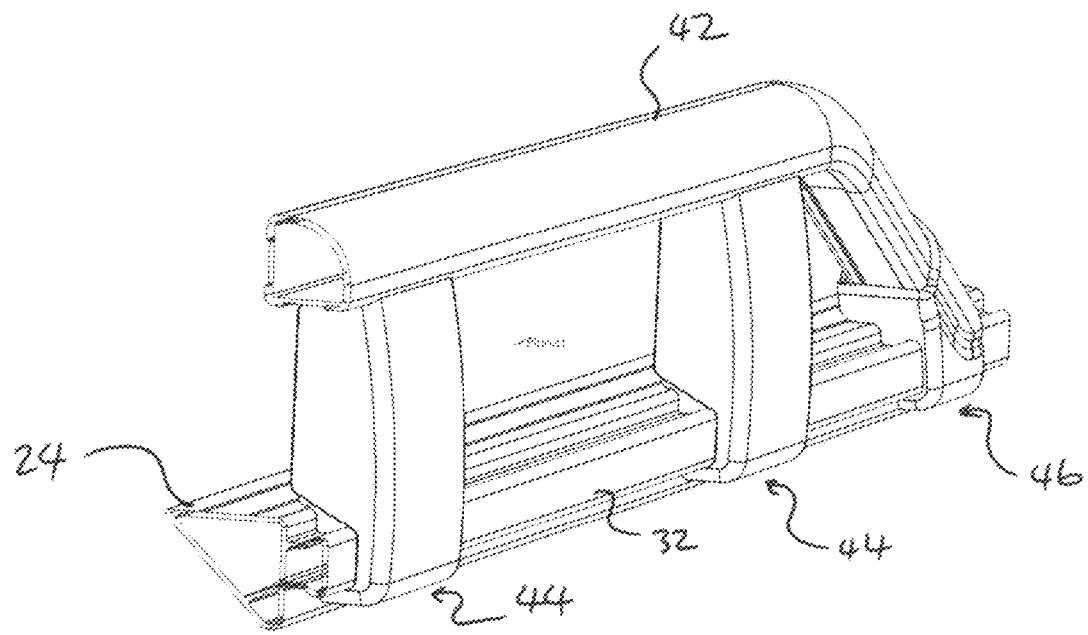
FIGS. 12 to 14 are perspective, exploded and cross-section views, respectively, of a mechanism for securing the guard rail to a slat of the assembly.
Figure 13:
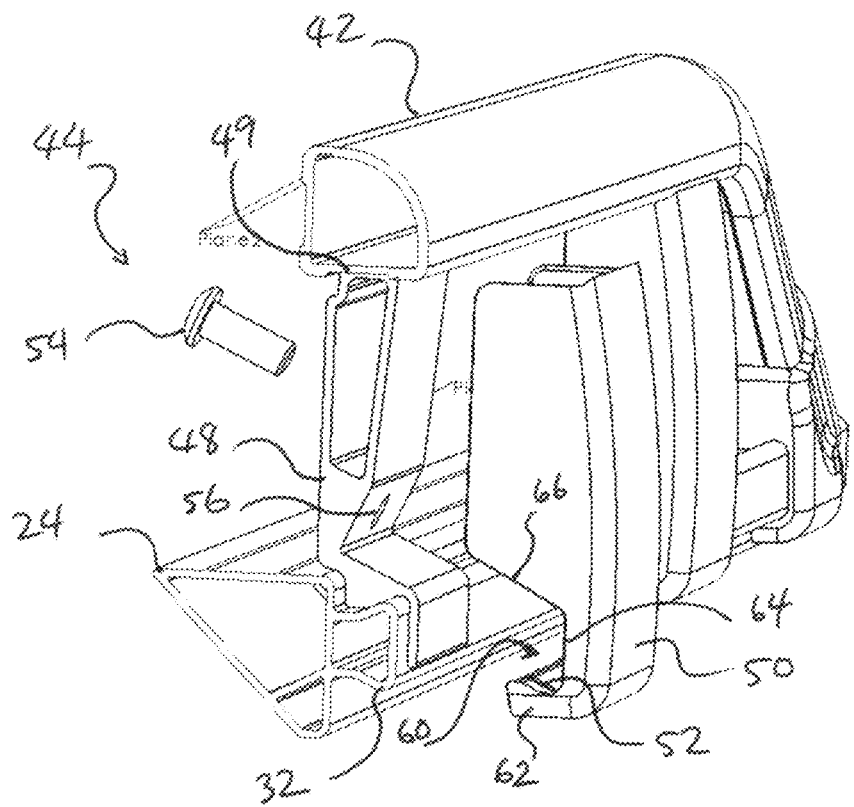
Figure 14:
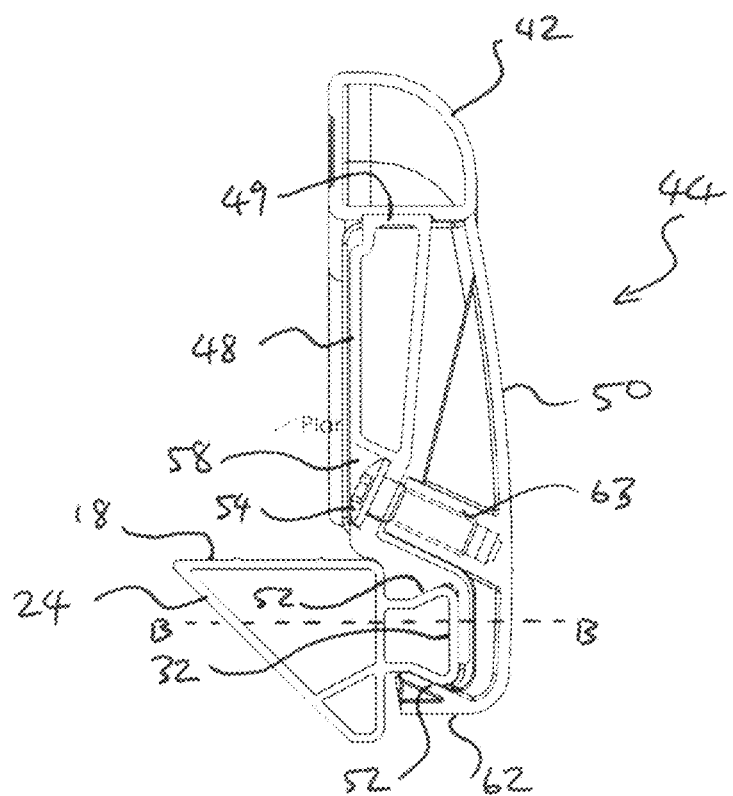
Figure 15:
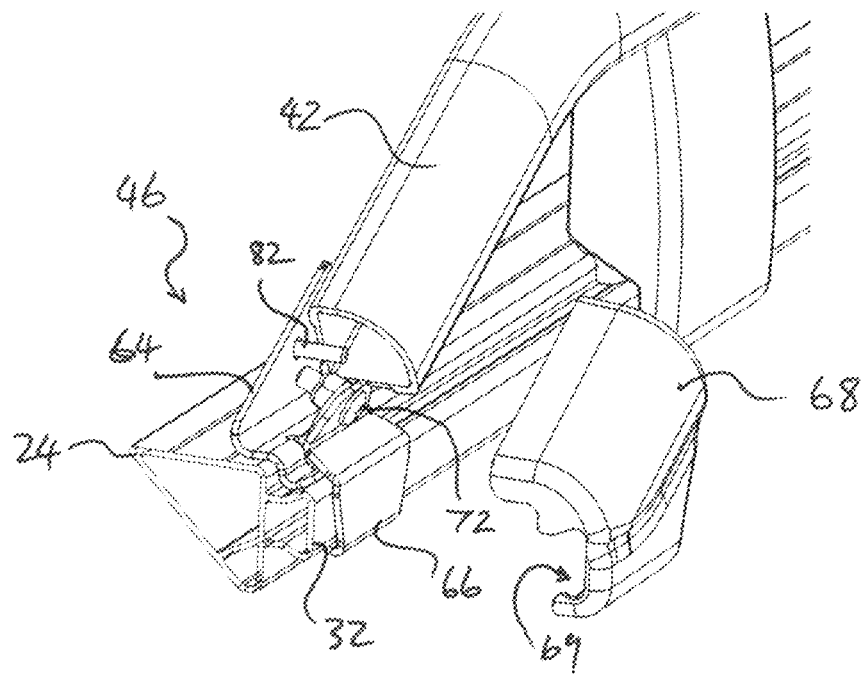
FIGS. 15 and 16 are perspective and exploded views, respectively, of an alternative mechanism for securing the guard rail to the slat.
Figure 16:
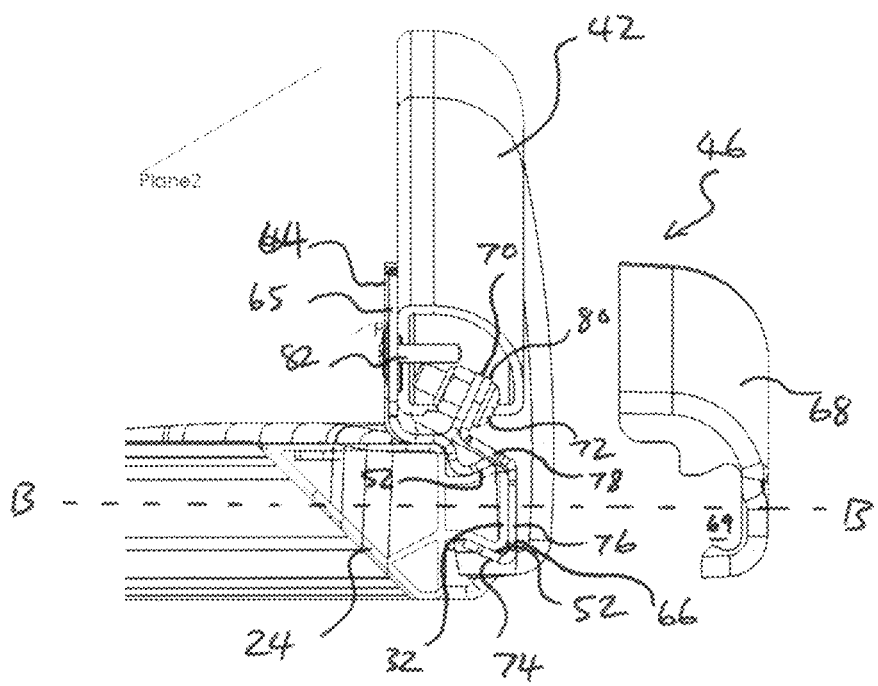

FIGS. 12 to 16 show two configurations of the engaging mechanism 16. FIGS. 12 to 14 show the engaging mechanism 16 configured as a support bracket sub-assembly 44. FIGS. 15 and 16 show the engaging mechanism 16 configured as an end cap sub-assembly 46. Whilst the sub-assemblies 44, 46 are shown secured to the flange 32 of the side-slat 24 it will be appreciated that the sub-assemblies 44, 46 are configured to be securable to the flange 32 of any of the cross-slats 22, 23.

The support bracket sub-assembly 44 comprises a first portion, configured as a bracket 48, and a second portion, configured as a cover 50, which is movable relative to the bracket 48. Each of the bracket 48 and the cover 50 define at least one abutment surface 52 arranged to, in use, abut against one of the retention surfaces 20. In the illustrated embodiment, each abutment surface 52 is configured to be complementary to the retention surface 20, being substantially planar and sloped at a complementary angle so that, in use, the abutment surface 52 lies against the retention surface 20.

The cover 50 is secured to the bracket 48 by an actuator, configured as a bolt 54, which is operable to cause at least one of the abutment surfaces 52 to move. Operating the bolt 54 draws the cover 50 towards the bracket 48. The bolt 54 is arranged transverse to the plane of the support surface 18, in the illustrated embodiment, being parallel to the angle of one of the retention surfaces 20. Arranging the bolt 54 in this way means that when the bolt 54 is operated, this exerts a linear force along an axis of the bolt 54 which causes the abutment surface 52 of the cover 50 to move along the adjacent retention surface 20. This action also at least partially urges the abutment surfaces 52 towards each other to clamp against the retention surfaces 20 to engage the sub-assembly 44 with the slat 24. This action may also cause the cover 50 to clamp against the end wall 34 of the flange 32.

The bracket 48 defines a free end 49 configured to join to the guard rail 42, typically being welded in place. The bracket 48 is shaped to abut against at least one of the support surface 18 and the end face 34. Shaping the bracket 48 in this way minimises movement of the bracket 48 relative to the slat 24 in the direction B-B, thereby assisting positioning the guard rail 42 relative to the support surface 20. This arrangement is useful as this allows the guard rail 42, joined to a plurality of brackets 48, to be lowered on to the platform 14 and easily located on adjacent flanges 32. The bracket 48 defines an aperture 56 and associated recess 58 which arranges the bolt 54 at the required angle, transverse to the direction B-B. In the illustrated embodiment, the bracket 49 is formed as an extrusion.

The cover 50 is shaped to at least partially cover the bracket 48 and define an opening 60. The opening 60 defines a re-entrant portion 62, defining an at least partially hooked shape, at one side, a side-wall 64 extending from the re-entrant portion 62, and a sloped surface 66 extending from the side-wall 64 and arranged to at least partially slope away from the re-entrant portion 62. The side-wall 64 is dimensioned to receive the free ends of the retention surfaces 20, in the embodiment shown, by receiving the end face 34 of the flange 32. The re-entrant portion 62 defines the abutment surface 52. Configuring the opening 60 in this way means that the cover 50 wraps around only one side of the flange 32, thereby allowing the cover 50 to be readily installed and removed from the bracket 48 from outside the periphery of the platform 14, thereby securing the guard rail 42 to the platform 14.

The cover 50 houses a threaded insert 63 arranged to receive and threadedly engage with the bolt 54. It will however be appreciated that the bracket 48 and cover 50 may be alternatively configured so that the bracket 48 houses the insert 63 and the bolt 54 be operated from the cover-side, where the bolt 54 is inserted through the cover 50 to engage with the insert 63. In the illustrated embodiment, the cover 50 is formed as an injection moulding or die-casting.

The end cap sub-assembly 46 comprises a first portion, configured as an inner bracket 64, a second portion, configured as an outer bracket 66 and which is movable relative to the inner bracket 64, and an alternative cover 68. Each of the inner bracket 64 and the outer bracket 66 define at least one abutment surface 52 arranged to, in use, abut against one of the retention surfaces 20.

The inner bracket 64 defines a wall 65 arranged to join to the guard rail 42, typically being welded in place. The inner bracket 64 is shaped to receive a portion of the support surface 18, side-wall 30, junction section 36, and one retention surface 20. The inner bracket 64 has a tab 70 which defines an aperture for a bolt 72. The arrangement of the tab 70 arranges the bolt 72 transverse to the direction B-B and generally parallel to one of the retention surfaces 20. in the illustrated embodiment, the inner bracket 64 is formed from sheet metal.

The outer bracket 66 defines a re-entrant portion 74 at one side, defining an at least partially hooked shape, a side-wall 76 extending from the re-entrant portion 74, a sloped surface 78 extending from the side-wall and arranged to at least partially slope away from the re-entrant portion 74, and a tab 80 extending from the sloped surface 78 and defining an aperture for the bolt 72. The side-wall 76 is dimensioned to receive the end face 34 of the flange 32. The re-entrant portion 74 defines the abutment surface 52. Operating the bolt 72 draws the abutment surface 52 of the re-entrant portion 74 along the adjacent retention surface 20 causing the outer bracket 66 and inner bracket 64 to clamp the flange 32. In the illustrated embodiment, the outer bracket 66 is formed from sheet metal.

The cover 68 is shaped to cover the inner bracket 64 and the outer bracket 66. The cover 68 defines a thread to allow a fastener 82 to secure the cover 68 to the inner bracket 62. The cover defines an opening 69 at one end having a complementary shape to the flange 32, The opening 69 allows the cover 68 to be slid over the flange 32 from one end of the slat 24, or be resiliently deformed to snap-fit over the flange 32, so that the cover 68 engages the flange 32. In the illustrated embodiment, the cover 68 is formed as an injection moulding or die-casting.

Figure 17:
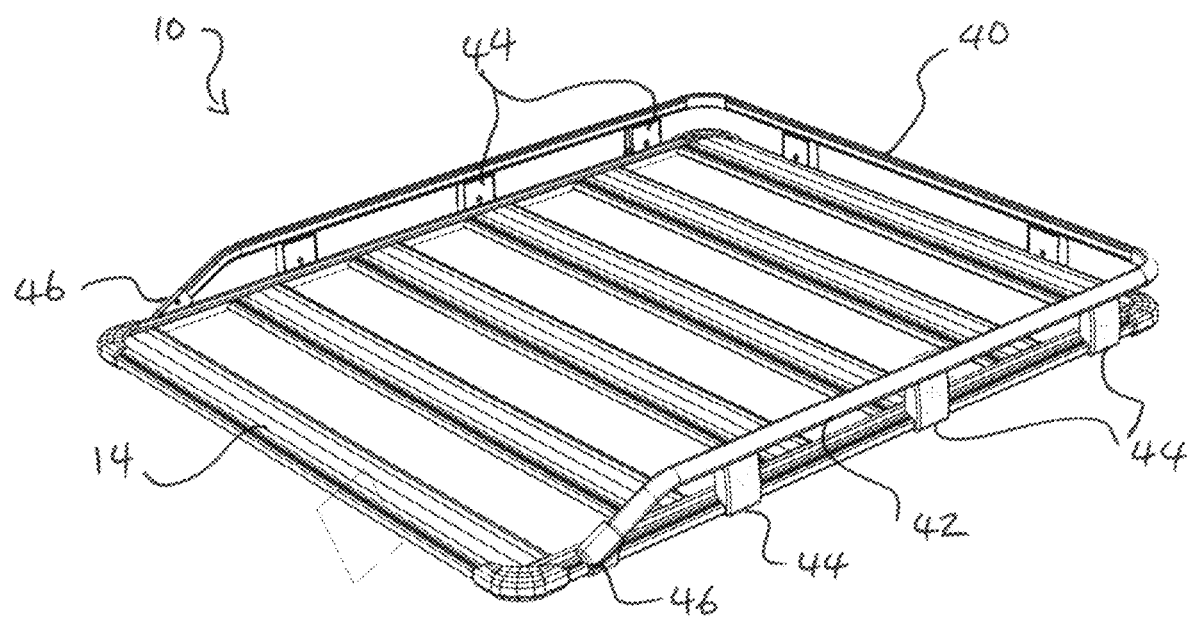
FIGS. 17 and 18 are perspective views of alternative configurations of the assembly shown in FIG. 1 including a guard rail arranged along three sides of the platform (FIG. 17), and in a continuous loop around a periphery of the platform (FIG. 18)
Figure 18:
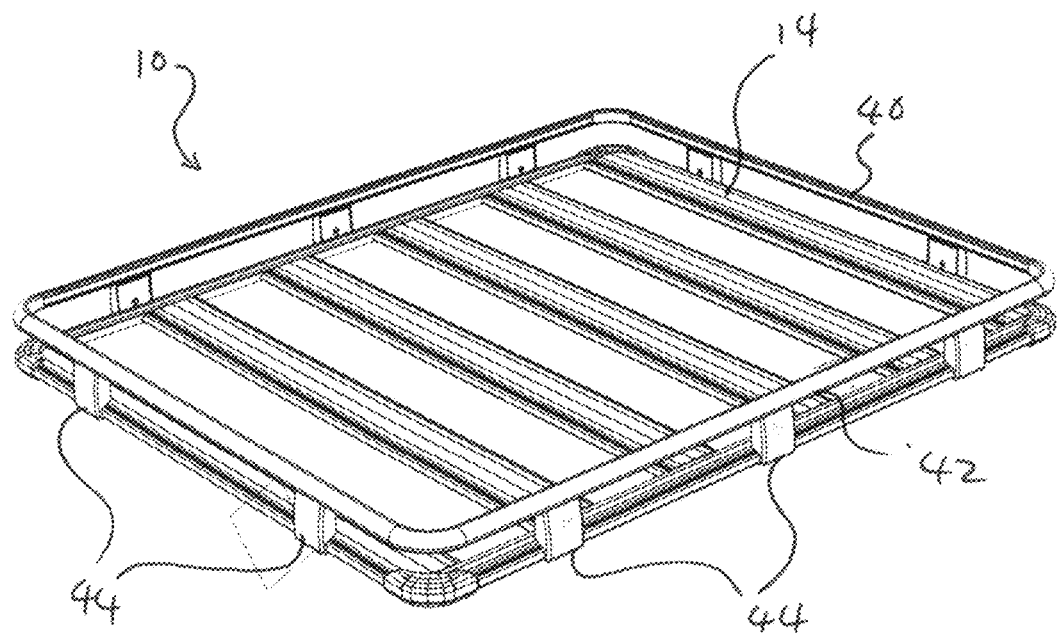

FIGS. 17 and 18 show alternative configurations of the assembly 10 having different guard rail assembly 40 configurations. FIG. 17 shows the guard rail assembly 40 configured so that the guard rail 42 extends around three sides of the platform 14 and is mounted to the platform by eight support bracket sub-assemblies 44 and two end cap sub-assemblies 46. FIG. 18 shows the guard rail assembly configured so that the guard rail 42 extends around all four sides of the platform 14 and is secured to the platform 14 by ten support bracket sub-assemblies 44.

Figure 19:
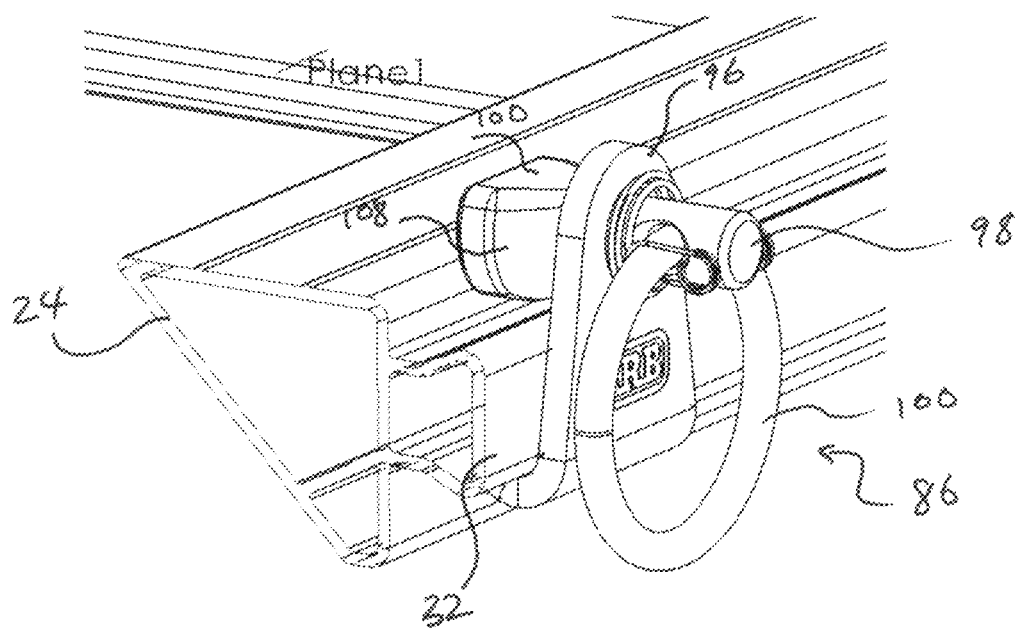
FIGS. 19 and 20 are perspective and cross-section views, respectively, of a mechanism for releasably connecting to one of the slats.
Figure 20:
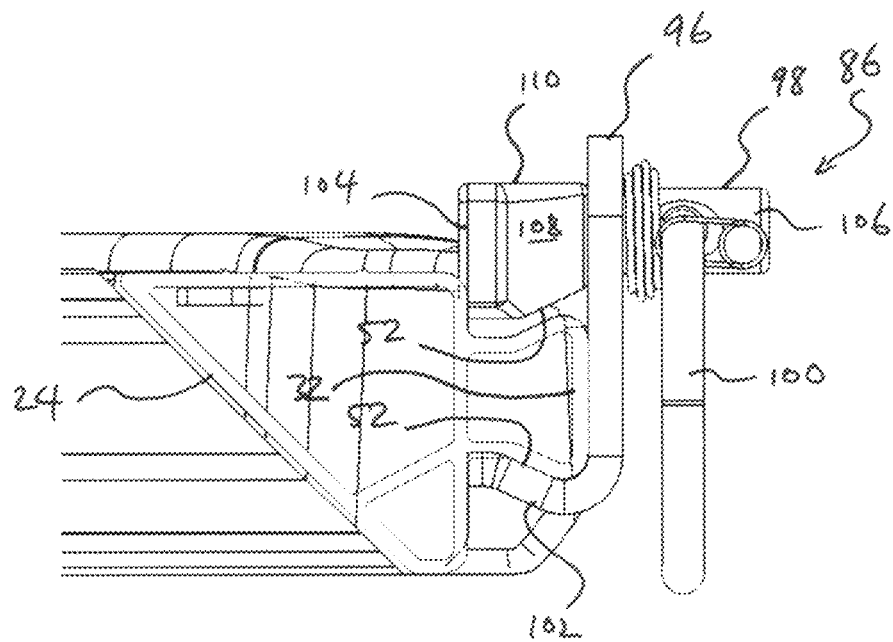
Figure 21:
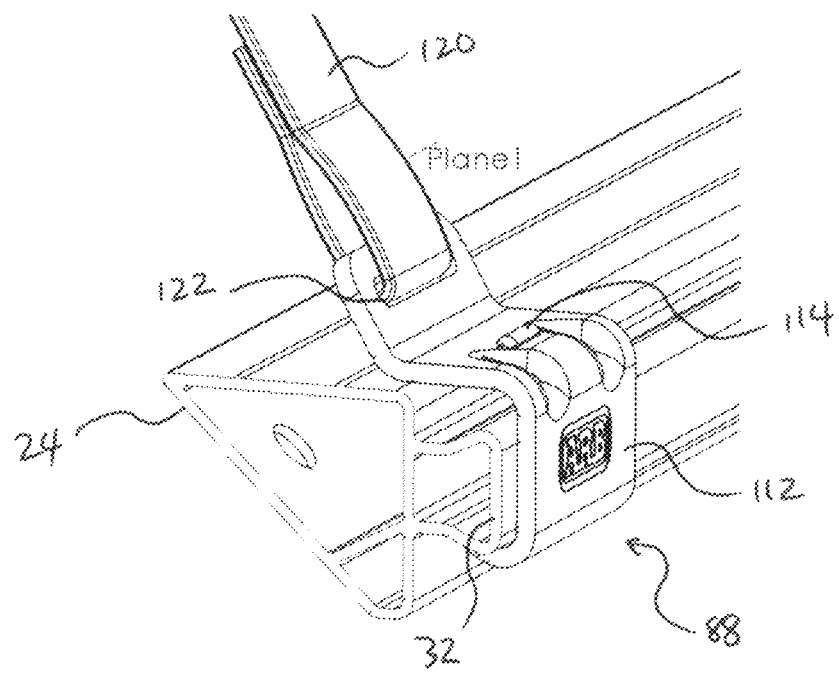
FIGS. 21 and 22 are perspective and cross-section views, respectively, of an alternative mechanism for releasably connecting to one of the slats.
Figure 22:
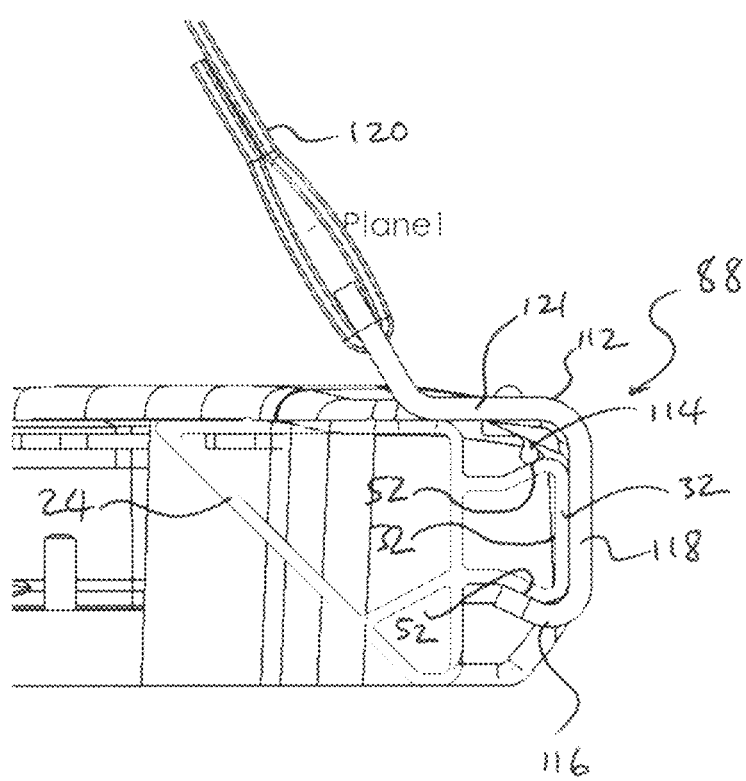
Figure 23:
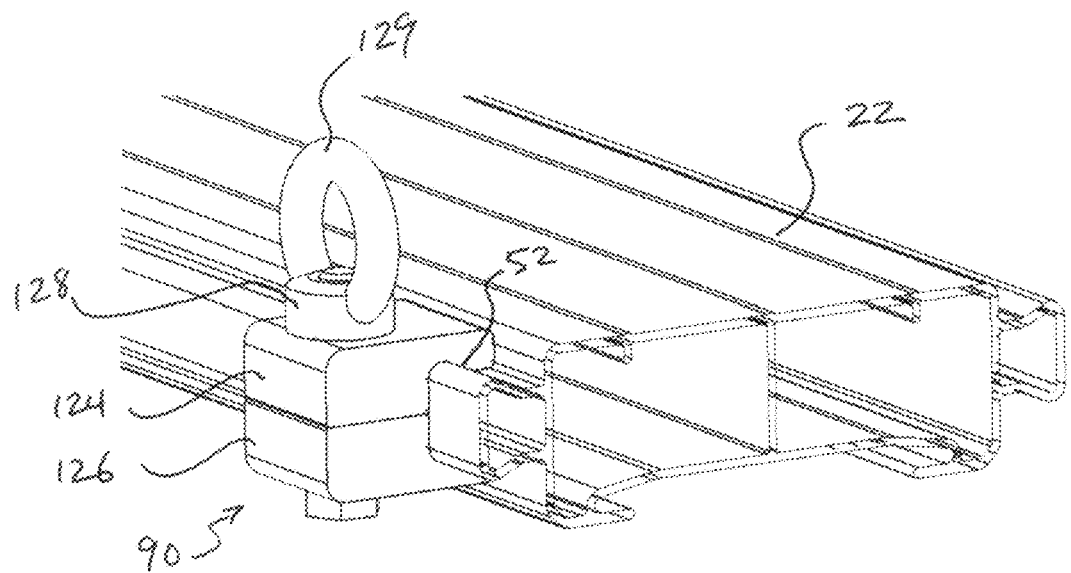
FIGS. 23 and 24 are perspective views of alternative configurations of a further alternative mechanism for releasably connecting to one of the slats.
Figure 24:
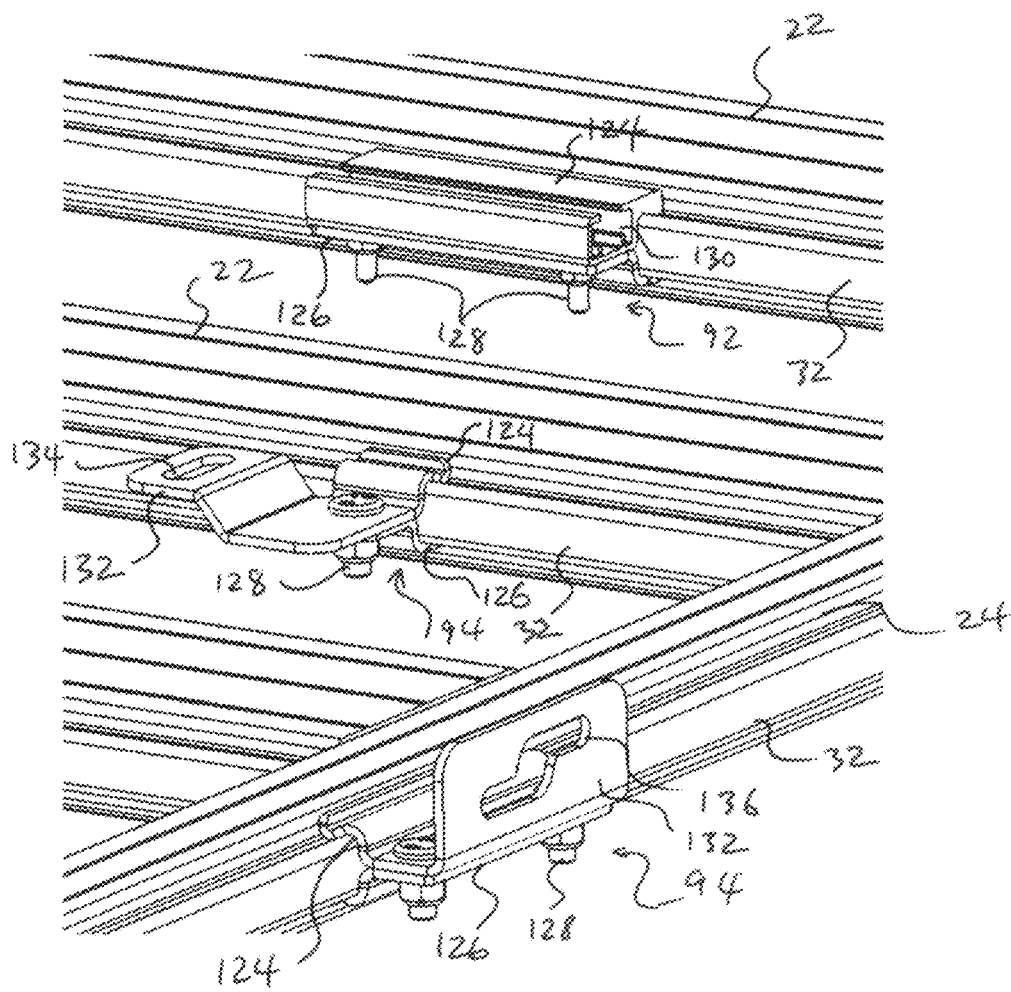

FIGS. 19 to 24 show three alternative configurations of the engaging mechanism 16 configured as various tie-down assemblies, each configured to enable a user to secure a strap, rope, cable, or the like, to the platform 14 to allow the user to tie the load to the platform 14. FIGS. 19 and 20 show the engaging mechanism 16 configured as a quick release tie-down sub-assembly 86. FIGS. 21 and 22 show the engaging mechanism 16 configured as a strap tie-down sub-assembly 88. FIGS. 23 and 24 show the engaging mechanism 16 configured as variations of a heavy duty tie-down sub-assembly 90, 92, 94.

The quick release tie-down sub-assembly 86 comprises a body 96, an actuator 98 which is movable relative to the body 96, and a connector 100. The body 96 includes a hooked portion 102 which defines an abutment surface 52 and an aperture (not visible). The actuator 98 defines a cam portion 104 and a shaft 106 extending from the cam portion 104. The cam portion 104 includes a flared or conical shaped section 108 having a flattened side 110. The conical section 108 defines the abutment surface 52. The shaft 106 extends through the aperture so that a free end is joined to the connector 100. In the illustrated embodiment, the connector 100 is configured as a ring to facilitate ease of connection to a range cords, such as ropes, cables, and straps, or connection mechanisms, such as carabiners or hooks. In use, rotation of the shaft causes the abutment surface 52 of the cam portion 104 to abut against one of the retention surfaces 20 for half of the rotation until the flattened side 110 faces towards the flange 32, whereby the abutment surface 52 ceases to abut the retention surface 20. The configuration of the actuator 98 in this way means that the user can readily engage or disengage the sub-assembly 86 with the slat 24 by rotating the actuator 180 degrees (or less).

The strap tie-down sub-assembly 88 comprises a body 112, a resilient member 114 which is movable relative to the body 112, and a strap 120. The body 112 includes a hooked portion 116 which defines an abutment surface 52, a side-wall 118 extending from the hooked portion 116 and a top section 121 which defines a slot 122 dimensioned to receive the strap 120. In the illustrated embodiment, the top section 121 is arranged relative to the hooked portion 116 so that the top section 121 abuts the support surface 18 of the slat 24 when the abutment surface 52 abuts one of the retention surfaces 20. It will be appreciated that the top section 120 may be alternatively configured, such as extending at an angle relative to, and not contacting, the support surface 18.

The resilient member 114 is joined to the body 112 and extends towards the hooked portion 116 to define another abutment surface 52. The abutment surface 52 of the resilient member 114 is arranged relative to the abutment surface 52 of the hooked portion 116 to cause the resilient member 114 to be resiliently deformed when the abutment surfaces 52 are arranged against the retention surfaces 20. In the illustrated embodiment, the resilient member 114 is formed entirely from a resiliently deformable material however it will be appreciated that only part of the member 114 which defines the abutment surface 52 may be formed from the resiliently deformable material.

The heavy duty tie-down sub-assemblies 90, 92, 94 are variations of the same assembly, whereby common reference numerals indicate common features. Each sub-assembly 90, 92, 94 includes an upper jaw 124, a lower jaw 126 and an actuator, in the form of one or more bolts 128. Each jaw 124, 126 define an abutment surface 52. The jaws 124, 126 are movable relative to each other. Operating the bolt(s) 128 causes the jaws 124, 126 to move so that, in use, the abutment surfaces 52 urge against the retention surfaces 20 of any slat 22, 23, 24.

FIG. 23 shows a ring 129 joined to the bolt 128 to allow a cord or connector mechanism to be secured to the sub-assembly 90.

FIG. 24 shows the upper jaw 124 of one of the sub-assemblies 92 defining a channel 130. The channel 130 is shaped to receive a fastener, for example, to allow a T-shaped bolt to be secured to the platform 14, via the sub-assembly 92. This allows an accessory which utilises a T-bolt connector, such as a bicycle or kayak carrier, to be secured to the platform 14.

FIG. 24 also shows the upper jaw 124 of two other sub-assemblies 94 defining a bracket 132. In the illustrated embodiments, the bracket 132 defines an aperture 134 or slot 136 and is arranged to extend, in use, parallel or perpendicular relative to the support surface 18. The bracket 132 allows a range of other accessories or objects, such as jacks, awnings, jerry cans, gas bottles, and the like, to be secured to the platform 14.

Figure 25:
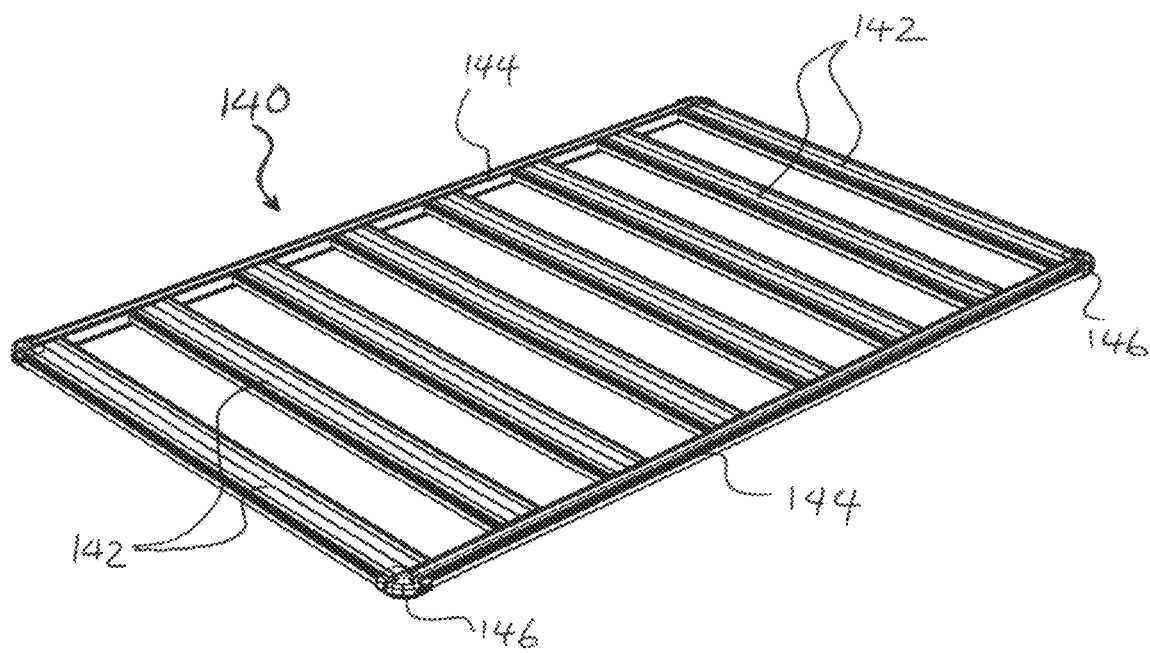
FIG. 25 is a perspective view of an alternative embodiment of a vehicle roof tray assembly configured as a platform.

FIG. 25 shows an alternative vehicle roof tray assembly, in the form of a platform 140. The platform 140 shares features with the platform 14 described above, whereby common reference numerals indicate common features.

The platform 140 comprises cross-slats 142 which are joined to side-slats 144. Each cross-slat 142 and side-slat 144 includes an opposed pair of the flanges 32 which define the retention surfaces 20. This allows the platform 140 to be secured to an engaging mechanism 16, such as any of the support bracket sub-assembly 44, end cap sub-assembly 46, or the tie-down sub-assemblies 86, 88, 90, 92, 94.

The platform 140 is formed from a linear array of the cross-slats 142 being joined to a pair of the side-slats 144. A corner assembly 146 is secured at each corner of the platform 140. The corner assembly 146 includes a pair of housings (not illustrated) which are arranged on opposed sides of the platform 14 and joined to each other, typically by a plurality of fasteners (not illustrated).

Figure 26:
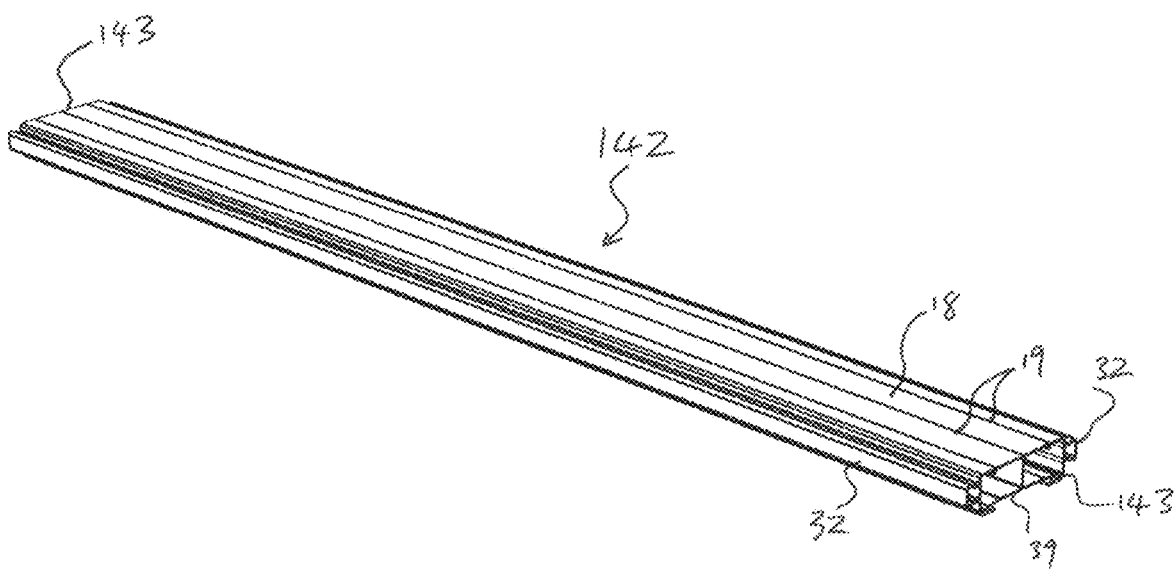
FIG. 26 is a perspective view of a slat which forms part of the platform shown in FIG. 25.
Figure 27:
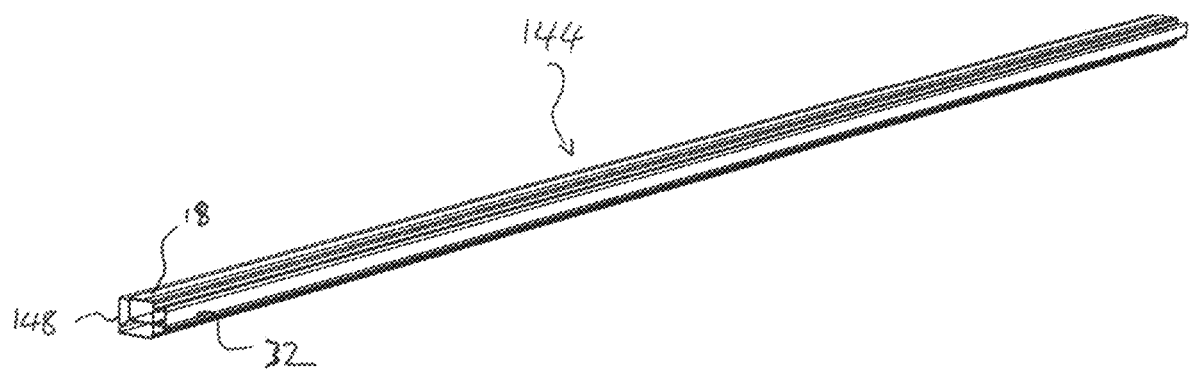
FIGS. 27 and 28 are perspective and end views, respectively, of an alternative slat which forms part of the platform shown in FIG. 25.
Figure 28:
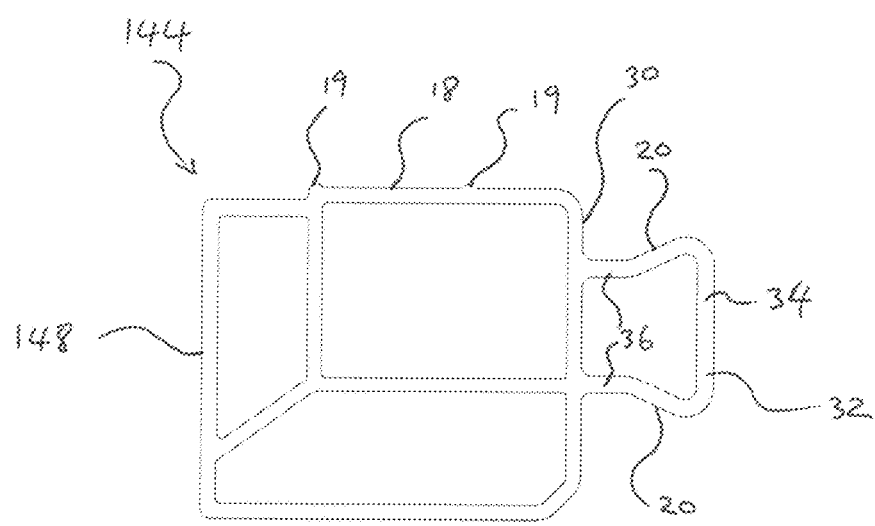

As shown in FIG. 28, each side-slat 144 defines a substantially box-shaped cross-section having a junction surface 148 arranged at one side of and perpendicular to the support surface 18. Each cross-slat 142 defines a cross-sectional profile which is identical to the slats 22, 23, shown in FIGS. 4 and 7. As shown in FIG. 26, each cross-slat 142 has straight-cut ends 143 to allow abutting the cross-slat 142 against the junction surface 148.

To assemble the platform 140, the ends 143 of the cross-slats 142 are positioned against the side-slats 144 and welded to permanently affix the slats 142, 144 together. It will be appreciated that other joining techniques may be employed, such as bonding with adhesive(s) and/or connecting with mechanical fasteners, for example, to allow releasably fixing the slats 142, 144 together.

Use of the assembly 10 involves positioning the platform 14 to be spaced above the roof of the vehicle and securing any of the engaging mechanisms 16 to the retention surfaces 20 defined by one of the slats 22, 23, 24. The load, such as cargo, is then supported on the support surface 18 of one or more of the slats 22, 23, 24 above the roof.

Use may involve securing an engaging mechanism 16 configured as a mounting bracket (not illustrated) to mount the platform 14 above the roof. Additionally or alternatively, use may involve securing the guard rail 42, via a plurality of support bracket sub-assemblies 44 and/or a pair of end cap sub-assemblies 46, to one or more of the side-slats 24 and the second cross-slats 23 thereby arranging the guard rail 42 along at least one side of the platform 14. Further additionally or alternatively, use may involve securing one or more tie-down sub-assemblies 86, 88, 90, 92, 94 to the retention surfaces 20 defined by one of the slats 22, 23, 24 to allow an object, such as a cord, strap and/or accessory, to be secured to the platform 14.

The diverging configuration of the retention surfaces 20, relative to the support surface 18, is advantageous, as this provides a robust structure to engage the engaging mechanism 16. In particular, the diverging arrangement of the retention surfaces 20 optimises surface area for the engaging mechanism 16 to grip and assists distributing load across the associated slat 22, 23, 24.

The protruding arrangement of the retention surfaces 20 extending away from the support surface 18 minimises regions in which dust/dirt and/or moisture can collect, effectively defining a self-cleaning securement region due to air flow. This enhances ease of connecting the engaging mechanism 16 to the retention surfaces 20 and reduces the likelihood of the elongate member 14 corroding or otherwise failing due to material degradation. The protruding arrangement of the retention surfaces 20 relative to the support surface 18 also enhances manufacture as the retention surfaces 20 can be evenly coated, for example, during a powder coating process, which consequently enhances durability of the elongate member 14.

The arrangement of the flange 32, defining the retention surfaces 20, to be spaced perpendicularly from the support surface 18 means that the engaging mechanism 16, when engaging the retention surfaces 20, may be arranged level with or below the support surface 18. This arrangement is useful as this allows objects, such as cargo, to be moved along the support surface 18 unhindered by any engaging mechanism 16. This arrangement also allows the engaging mechanism 16 to be arranged between cross-slats 22, 23 to optimise use of space occupied by the platform 14 and without hindering passage of cargo across the platform 14.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. An assembly for supporting a load relative to a roof of a vehicle, the assembly comprising:
   an elongate member defining a support surface configured to support the load, and having a pair of opposed, diverging retention surfaces extending away from the support surface; and
   an engaging mechanism defining a pair of opposed abutment surfaces shaped to be complementary to the retention surfaces, the abutment surfaces configured so that, in use, each abutment surface abuts and lies against one of the retention surfaces, the engaging mechanism operable to urge the abutment surfaces against the retention surfaces to engage the elongate member.

2. The assembly according to claim 1, wherein the support surface extends in a first direction and the retention surfaces extend outwardly from a side of the support surface to diverge relative to the first direction.

3. The assembly according to claim 1, wherein the retention surfaces are defined by at least one flange extending relative to the support surface.

4. The assembly according to claim 1, wherein each retention surface has a free end, and the elongate member includes an end face joining the free ends.

5. The assembly according to claim 1, wherein the elongate member defines a sidewall extending transverse to the support surface, and the retention surfaces are defined by at least one flange extending from the sidewall.

6. The assembly according to claim 5, wherein the retention surfaces are spaced from the sidewall by a junction portion extending from the sidewall.

7. The assembly according to claim 5, wherein the support surface is planar, and the, or each, flange defines a free end arranged operatively below the plane of the support surface.

8. The assembly of claim 5, wherein the engaging mechanism is configured to, in use, abut at least one of the support surfaces and the sidewall.

9. The assembly according to claim 1, wherein the retention surfaces are defined on opposed sides of a flared flange.

10. The assembly according to claim 1, wherein the elongate member is an extrusion, and the support surface and the retention surfaces are integrally formed surfaces of the extrusion.

11. The assembly according to claim 1, wherein the engaging mechanism comprises two portions, each portion defining one of the abutment surfaces, and wherein at least one of the portions is movable relative to the other portion, so that, in use, the abutment surfaces urge against the retention surfaces.

12. The assembly according to claim 10, wherein the engaging mechanism includes an actuator operable to move at least one of the portions relative to each other.

13. The assembly according to claim 12, wherein the support surface is planar, and wherein the actuator is arranged to exert a linear force transversely to the plane of the support surface.

14. The assembly according to claim 12, wherein each retention surface is planar, and wherein the actuator is arranged to exert the linear force parallel to the plane of one of the retention surfaces.

15. The assembly according to claim 14, wherein a first portion of the engaging mechanism is shaped to abut the support surface, and a second portion of the engaging mechanism defines a re-entrant portion defining the abutment surface, and wherein the actuator is operable to move the abutment surface of the re-entrant portion along one of the retention surfaces.

16. The assembly according to claim 15, wherein the first portion defines a free end configured to support an object relative to the support surface, and the second portion is configured as a cover shaped to at least partially cover the first portion.

17. The assembly according to claim 11, wherein at least one of the abutment surfaces is defined by a resiliently deformable material.

18. The assembly according to claim 11, wherein one of the two portions of the engaging mechanism defines a partially enclosed channel.

19. The assembly according to claim 18, wherein the channel is arranged to extend parallel to the support surface.

20. The assembly according to claim 11, wherein one of the two portions of the engaging mechanism includes a bracket defining one or more apertures configured to receive a fastener.

21. The assembly according to claim 20, wherein the bracket is arranged to extend substantially perpendicular to the support surface.

22. The assembly according to claim 1, wherein the actuator is operable to rotate one of the abutment surfaces, and wherein, in use, rotating the actuator causes rotation of the one of the abutment surfaces to engage one of the retention surfaces.

23. The assembly according to claim 22, wherein the one of the abutment surfaces is defined on a cam portion.

24. The assembly according to claim 1, wherein the elongate member is configured as a slat, wherein, in use, the slat is associated with like slats to form a platform to support the load.

25. A vehicle roof tray assembly for supporting a load relative to a roof of a vehicle, the assembly comprising:
a plurality of slats connected together to form a platform, each slat defining a support surface configured to support the load, and each slat having a pair of opposed, diverging retention surfaces extending away from the support surface; and
an engaging mechanism defining a pair of opposed abutment surfaces shaped to be complementary to the retention surfaces, the abutment surfaces configured so that, in use, each abutment surface abuts and lies against one of the retention surfaces of one of the slats, the engaging mechanism operable to urge the abutment surfaces against the retention surfaces to engage the slat.

26. The vehicle roof tray according to claim 25, wherein the platform defines a peripheral region, and the plurality of slats are arranged so that at least some of the retention surfaces extend from the peripheral region.

27. The vehicle roof tray according to claim 25, wherein each slat defines a longitudinal length, and the retention surfaces extend along the longitudinal length.

* * * * *